3,117,831
COLORATION OF POLYACRYLONITRILE MATERIAL
Henry R. Mautner, Leonia, N.J., assignor to General Aniline & Film Corporation, New York, N.Y., a corporation of Delaware
No Drawing. Filed Aug. 18, 1960, Ser. No. 50,315
7 Claims. (Cl. 8—55)

This invention relates to the coloration of polyacrylonitrile material and more particularly to the coloration of structures containing 50% by weight of polymerized acrylonitrile.

There has been of late an accelerated growth in the production of polyacrylonitrile structures in a number of different forms and for a number of different uses. For a substantial number of such uses, it is required that these structures be supplied in a wide range of colors. Since polyacrylonitrile is relatively insoluble, unreactive and hydrophobic, coloration thereof by usual dyeing and printing techniques has met with certain difficulties. Various expedients have been employed for improving the colorability of such structures, including the inclusion in the structure of dye receptive compounds or polymeric components, and the use of swelling agents, carriers, and/or elevated temperatures and pressures and the like. Some of these expedients have met with commercial acceptance but substantially all are subject to one or more disadvantages including insufficient color yields, ranges of colors, fastness properties and/or levelness or the like in addition to unduly high costs, etc.

In U.S. Patent No. 2,868,756 there is described and claimed a resinous acetone-insoluble terpolymer having a specific gravity of 0.1 to 0.6 and containing in the molecule about 60 to 75% of acrylonitrile, 10 to 30% of vinyl chloride, and 5 to 10% of vinylidene chloride, the sum of said copolymerized monomers equaling 100%. Fibers and other structures prepared from such terpolymer are especially resistant to coloration with a great many classes of dyestuffs including vats, soluble vats, direct acids, premetallized acids, disperse dyestuffs, basic dyestuffs, and azoic dyestuffs produced in situ on the fiber. These dyestuffs have generally produced dyeings of low yields even with use of carriers and temperatures of up to 250° F. or more under pressure.

It is an object of this invention to provide a process for the coloration of structures containing at least 50% by weight of polymerized acrylonitrile which will not be subject to one or more of the above disadvantages. Other objects and advantages will appear as the description proceeds.

The attainment of the above objects is made possible by this invention which includes a process comprising treating a structure containing at least 50% by weight of polymerized acrylonitrile in the presence of a water soluble thiocyanate with an aqueous medium containing a basic dye. The process of this invention enables the coloration of such structures, particularly the above described terpolymers, in a wide variety of different shades of improved color yield and fastness properties.

By "structures" is meant shaped articles such as fibers, filaments, yarns, slubbings, warps, fabrics, bristles, films, tubings, molded articles and the like. The polymerized acrylonitrile forming the basis of such structures is present in proportions of at least 50% by weight and in the form of recurring units as a homopolymer or in a copolymer, interpolymer, graft polymer, cross linked polymer, or mixture of polymers together with other polymerized monomers. As other polymerizable monomers which may be present in polymerized form in such structure in proportions of up to about 50% by weight, there may be employed any one or more of the following illustrative list of monomers: vinyl chloride, vinylidene chloride, vinyl fluoride, vinyl acetate, vinyl propionate, methyl vinyl ketone, n-vinyl pyridine, 2-vinyl pyridine, 4-vinyl pyridine, 5-ethyl-2-vinyl pyridine, 2- and 4-vinyl quinoline, n-vinyl pyrrolidone, divinyl benzene, vinyl methyl ether, vinyl butyl ether, and other vinyl alkyl ethers, vinyl imidizole, vinyl alcohol, styrene, and its derivatives such as α-methyl styrene and other vinyl or isopropenyl substituted aromatic hydrocarbons, methacrylic acid, acrylic acid, chloroacrylic acid and their amides, chlorides, nitriles, lower alkyl (methyl, ethyl, etc.) esters and the like, ethyl fumarate, ethyl maleate, and other alkyl esters of fumaric and maleic acid, vinyl chloracetate, isobutylene and other polymerizable hydrocarbons.

Other modifying agents such as plasticizers, etc., may of course be present in the structure, and the structure to be colored by the process of this invention may be admixed with other structures. For example, polyacrylonitrile fibers or yarns of the above described type may be present in a mixed fabric with other heterofibers such as cotton, wool, rayon, nylon, polyesters, and the like whereby a uniform coloration or an ornamental effect may be obtained depending upon the colorability of such heterofibers by the present process.

The basic dyes employed in the present process are a class of dyestuffs well known in the art, being characterized as salts of colored organic cations with simple anions which are usually inorganic in nature. Generally, such dyes are devoid of sulfonic and carboxylic acid groups and the like and are instead characterized by the presence of an amino group or a quaternary ammonium structure in which the anion is generally derived from a strong acid, e.g. chloride, bromide or iodide, metho or etho sulfate, sulfate or bisulfate, benzene, halogen (e.g. chloro, bromo) benzene or alkyl benzene (e.g. toluene) sulfonic acid. The anions of stronger acids generally yield more water soluble dyestuffs. The colored cations may, however, also be present as salts with weaker acids, e.g. the anions of acetic acid, formic acid, oxalic acid, lactic acid, tartaric acid. The double salts of the basic dyes may also be employed, particularly the zinc chloride double salts and the chlorozincate or chlorocadmiate ion. The anion may also be hydroxyl.

As stated above, many types of basic dyestuffs are known and readily available to the trade, including dyestuffs of the triarylmethane series, the oxazine series, the polymethine series, and the like. Commercially available basic dyestuffs are for example available under the Genacryl (General Aniline and Film Corporation) trademark, e.g. Genacryl Yellow 3G, Genacryl Orange G, Genacryl Red GB, Genacryl Blue 6G, Genacryl Red 6B, Genacryl Orange R, Genacryl Pink G, Genacryl Blue 5B, and the like.

As the water soluble thiocyanate, sodium or ammonium thiocyanate are preferred because of their ready availability, desirable solubility properties, and the like. Other water soluble thiocyanates may be employed including thiocyanic acid and water soluble alkali metal, alkaline earth metal and metal thiocyanates such as potassium, magnesium, calcium, barium, zinc, aluminum, tin, cadmium, lithium, guanidine, mono-(lower alkyl)-substituted guanidine, symmetrical and unsymmetrical di-(lower alkyl)-substituted guanidine (lower alkyl may be methyl, ethyl, etc.) thiocyanates and the like.

In general, the basic dyestuffs are applied to the polyacrylonitrile structure in amounts yielding about 0.1 to 10% of the dyestuff by weight of the structure. The water soluble thiocyanate is preferably employed in proportions of about 5 to 15% by weight of the polyacrylonitrile structure although amounts as low as 1% or less may be employed with of course a smaller degree of improvement in coloring properties.

The thiocyanate is preferably applied as a pretreatment although it may be applied simultaneously with the dyestuff to the polyacrylonitrile structure. Application of the dyestuff to the structure may be carried out in the known manner usual for the dyeing of structures such as textile fibers with basic dyestuffs according to which the fiber is placed in the dyebath liquor at room temperature up to 100 to 170° F. and the bath then heated to at least 180° F. and preferably to boiling temperatures and maintained at such temperatures until the dyebath is substantially exhausted. The use of super-atmospheric pressures and temperatures of 212 to 300° F., although operative, is not necessary in the present process.

The water soluble thiocyanate may be dissolved in the dyebath prior to insertion of the polyacrylonitrile structure, but it is preferred to apply the thiocyanate as a preliminary treatment. This may be carried out in a simple manner and in the same treating medium by first introducing the structure into an aqueous bath containing the thiocyanate at room temperatures up to 170° F. for 5 to 30 minutes and then adding the dyestuff to the bath and continuing as described above. Following completion of the dyeing process, the material is rinsed with water and washed with soap or synthetic detergent, preferably at elevated temperatures of 140 to 180° F.

The pH of the dyebath and/or the bath containing the thiocyanate is not critical but is preferably neutral or slightly acid to avoid any tendency for the basic dyestuff to precipitate. Generally, the pH will range from about 3 to 8.

The coloration may be carried out in a batch or continuous manner and in such manner as to yield an overall or local ornamental effect. If desired, the dyestuff may be applied by a printing process in which case the dye medium is thickened in known manner with the usual thickening agents such as starch, gum tragacanth, gum arabic, etc.

It will be understood that the process may be carried out in conjunction with any of the known procedures and with the addition of known dyeing assistants, swelling agents, softening agents, wetting agents, and the like.

The following examples in which parts are by weight unless otherwise indicated are only illustrative of this invention and are not to be regarded as limitative.

*Example 1*

A 10 g. sample of cloth woven of 100% filament containing about 62% acrylonitrile, 23% vinyl chloride and 15% vinylidene chloride and produced as described in Example 2 of U.S. Patent 2,868,756 was scoured in a bath containing 0.5% OWF (on the weight of the fiber) of the condensation product of nonyl phenol with 6 moles of ethylene oxide for 20 minutes, and then rinsed.

A 300 cc. aqueous bath containing 1 g. of sodium thiocyanate was heated to 160° F. and the scoured cloth introduced therein and worked for 15 minutes. 0.10 g. of Genacryl Orange R (Color Index No. 48040) was then added and the temperature raised to a boil and maintained at the boil for 1½ hours. The cloth was then removed, rinsed and soaped with 0.5% (OWF) sodium N-methyl tauride and 1 to 2% (OWF) soda ash for 20 minutes at 160° F. A full shade of orange with good fastness properties was obtained. When the above procedure was repeated but without employing the thiocyanate, only a fraction of the color yield was obtained and the dyeing was weak and commercially unacceptable. The dyeing obtained with the use of the thiocyanate was 3 to 5 times stronger than the dyeing obtained without the use of the thiocyanate. Substantially no improvements were obtained when the thiocyanate was employed with disperse or anionic dyestuffs.

*Example 2*

The procedures of Example 1 were repeated except that ammonium thiocyanate was employed instead of sodium thiocyanate. Similar improvements were obtained.

*Example 3*

The procedures of Examples 1 and 2 were repeated except that the Genacryl Orange R was replaced in each instance by, respectively, Genacryl Orange G (Color Index No. 48035), Genacryl Red GB (Color Index No. 48020), Genacryl Pink G (Color Index No. 48015), and Genacryl Blue 5B (Color Index No. 42140). Commercially acceptable dyeings in a wide range of colors were thus obtained having similarly improved properties.

This invention has been disclosed with respect to certain preferred embodiments and various modifications and variations thereof will become obvious to persons skilled in the art.

I claim:

1. A process for coloring a shaped structure composed essentially of a resinous acetone insoluble terpolymer having a specific viscosity of 0.1 to 0.6 and containing in the molecule about 60 to 75% of acrylonitrile, 10 to 30% of vinyl chloride, and 5 to 20% of vinylidene chloride, the sum of said copolymerized monomers equalling 100%, comprising subjecting said structure to treatment in aqueous media with a basic dye and about 1 to 15% of a water soluble thiocyanate by weight of said structure.

2. A process as defined in claim 1 whereby said water soluble thiocyanate is sodium thiocyanate.

3. A process as defined in claim 1 wherein said water soluble thiocyanate is ammonium thiocyanate.

4. A process for coloring a shaped structure composed essentially of a resinous acetone insoluble terpolymer having a specific viscosity of 0.1 to 0.6 and containing in the molecule about 60 to 75% of acrylonitrile, 10 to 30% of vinyl chloride, and 5 to 20% of vinylidene chloride, the sum of said copolymerized monomers equalling 100%, comprising subjecting such structure to treatment with an aqueous medium containing both a basic dye and about 1 to 15% of a water soluble thiocyanate by weight of said structure.

5. A process as defined in claim 4 whereby said water soluble thiocyanate is sodium thiocyanate.

6. A process as defined in claim 4 wherein said water soluble thiocyanate is ammonium thiocyanate.

7. A process for coloring a shaped structure composed essentially of a resinous acetone insoluble terpolymer having a specific viscosity of 0.1 to 0.6 and containing in the molecule about 60 to 75% of acrylonitrile, 10 to 30% of vinyl chloride, and 5 to 20% of vinylidene chloride, the sum of said copolymerized monomers equalling 100%, comprising treating said structure first with an aqueous medium containing about 1 to 15% of a water soluble thiocyanate by weight of said structure, and then with an aqueous medium containing a basic dye.

References Cited in the file of this patent

UNITED STATES PATENTS

| | | |
|---|---|---|
| 2,482,578 | Doggett et al. | Sept. 20, 1949 |
| 2,558,734 | Cresswell | July 3, 1951 |
| 2,558,735 | Cresswell | July 3, 1951 |
| 2,740,687 | Ham | Apr. 3, 1956 |
| 2,774,648 | Mecco et al. | Dec. 18, 1956 |
| 2,868,756 | Walter | Jan. 13, 1959 |
| 2,939,759 | Scalera et al. | June 7, 1960 |